United States Patent
Neuberger

[11] Patent Number: 5,621,843
[45] Date of Patent: Apr. 15, 1997

[54] SILICA LIGHTGUIDE FOR UV APPLICATIONS

[75] Inventor: Wolfgang Neuberger, Monchengladbach, Germany

[73] Assignee: CeramOptec Industries, Inc., East Longmeadow, Mass.

[21] Appl. No.: 257,550

[22] Filed: Jun. 9, 1994

[51] Int. Cl.⁶ ............................................. G02B 6/02
[52] U.S. Cl. .................................. 385/123; 385/141
[58] Field of Search .................................. 385/123, 127, 385/128, 2, 8, 141, 102, 43, 96, 88

[56] References Cited

U.S. PATENT DOCUMENTS

| | | | |
|---|---|---|---|
| 3,732,425 | 5/1973 | Ellert et al. ................... | 385/127 X |
| 4,389,230 | 6/1983 | Modone et al. ................ | 65/3.12 |
| 4,737,002 | 4/1988 | Boucouvalas .................. | 385/42 |
| 4,773,413 | 9/1988 | Hussein et al. ................ | 128/303.1 |
| 4,776,665 | 10/1988 | Oestreich ....................... | 385/102 |
| 4,979,796 | 12/1990 | Cardarelli et al. ............. | 385/123 |
| 5,235,659 | 8/1993 | Atkins et al. .................. | 385/124 |
| 5,242,437 | 9/1993 | Everett et al. ................. | 606/15 |
| 5,495,548 | 2/1996 | Bilodeau et al. ............... | 385/123 |

OTHER PUBLICATIONS

Bilodeau et al, "Photosensitization of optical fiber and silica-on-silicon/silica waveguides", Optics Letters, vol. 18, No. 12, Jun. 15, 1993, pp. 953–954.

Malo et al, "Elimination of photoinduced absorption in Ge–doped silica fibers by annealing of ultraviolet colour centers", Electronic Letters, 28(17), Jun. 1992.

Simmons et al, "Photosenisitivity of solgel–derived germanosilicate planar waveguides", Optics Letters, vol. 18, No. 1, Jan. 1, 1993, pp. 25–27.

*Primary Examiner*—Rodney B. Bovernick
*Assistant Examiner*—Hemang Sanghavi
*Attorney, Agent, or Firm*—Bolesh J. Skutnik

[57] ABSTRACT

The present invention is directed at a lightguide, at a method of making the lightguide, and at a method of using the lightguide for the stable transmission of UV light. The lightguide includes a core, a cladding overlying the core, and a resistive element overlying the cladding for elevating the temperature of the fiber. The resistive element has sufficient resistance to produce heat when conducting electric current. Alternatively, the fiber can be heated by irradiating the core with IR light at an OH absorption wavelength. Both of these means for heating the lightguide can be enhanced if the cladding consists of a microporous silica layer. Moreover, the UV transmission properties of the fiber are further enhanced by impregnating the microporous silica layer with hydrogen or deuterium gas. A preferred embodiment of the invention also uses a hermetic coating over the microporous silica layer to retard the diffusion of the gas from the fiber.

17 Claims, 4 Drawing Sheets

5,621,843

SILICA LIGHTGUIDE FOR UV APPLICATIONS

BACKGROUND OF THE INTENTION

1. Field of the Invention

The present invention relates to optical fibers (lightguides) which are used in remote spectroscopy applications and in medical applications. These applications require the transmission of either ultra-violet (UV) laser energy for performing surgical procedures or lower energy, UV light for irradiating or illuminating a surface.

2. Information Disclosure Statement

A growing number of applications in spectroscopy and medicine are being designed to isolate the spectrometer or the medical laser/light source from the actual site being viewed or operated on. Optical fibers play a critical part in making such applications possible. In these applications, a need exists to have good, stable transmission in the wavelength region below 325 nm as well as throughout the visible near-IR (infra-red) region of the spectrum. Although spectroscopic applications employ low energy irradiation sources for extended periods of time and the medical applications—especially surgical applications—employ high energy sources for short durations, both applications need stable (i.e. low UV sensitive) optical fibers to function properly. Small drifts in the transmission properties over time affect the output in spectroscopic applications perhaps greater than absorbing defects affect laser light in surgical procedures.

Generally speaking, optical fibers with pure silica cores are the most resilient to irradiation damage if they have a minimum of latent defect centers. Similar to an optical fiber's exposure to ionizing radiation (see, e.g., D. L. Griscom, *Overview of Radiation Effects in Fiber Optics*, 541 SPIE Proc. 70–88 (1985)), increased exposure to UV radiation increases a fiber's transmission loss (see, e.g., U. Grzesik et al., *Reduction of Photodegradation in Optical Fibers for Excimer Laser Radiation*, 1649 SPIE Proc. 80–90 (1992)). The transmission performance of the lightguides degrades particularly strongly and quickly when the fibers are used for the transmission of wavelengths below 280 nm (i.e. the far UV range). Similar problems are observed using pulsed excimer laser transmission at 308 nm. The degradation in transmission is observed with Silica/Silica fibers, which usually have a pure, high OH content silica core with a fluorine doped silica cladding, and with Plastic Clad Silica (PCS) optical fibers. The problem can be solved either by frequently replacing the fibers or by cutting off the end of the fiber which is exposed to the source of the UV radiation (i.e. the end receiving the highest UV exposure per unit time) and re-terminating the fiber.

The defect centers which cause the largest decreases in transmission in the UV region for major absorptions at 163 nm, 248 nm and 210 nm are identified as Si—Si, $Si_3^+$ and E-centers respectively and are related to oxygen vacancies. The process of fiber drawing increases the vacancy defect population, and it was found that the maximum concentration of the vacancies is in the 8–10 µm layer of the core near the cladding layer. The presence of high OH content in the core mitigates much of these problems, but sacrifices transmission in regions above 820 nm where overtones of the strong OH bond absorption occur. Fortunately, for most UV applications of remote spectroscopy or surgery, moderate to high OH levels in the core pose no major detriment.

SUMMARY OF THE INVENTION

The present invention is directed at a lightguide, at a method of making the lightguide, and at a method of using the lightguide for the stable transmission of UV light. The lightguide includes a core, a cladding overlying the core, and a resistive element overlying the cladding for elevating the temperature of the fiber. The resistive element has sufficient resistance to produce heat when conducting electric current. Alternatively, the fiber can be heated by irradiating the core with IR light at an OH absorption wavelength. Both of these means for heating the lightguide can be enhanced if the cladding consists of a microporous silica layer. Moreover, the UV transmission properties of the fiber are further enhanced by impregnating the microporous silica layer with hydrogen or deuterium gas. A preferred embodiment of the invention also uses a hermetic coating over the microporous silica layer to retard the diffusion of the gas from the fiber.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention is directed at a fiber having improved properties for the transmission of UV laser energy or UV light. Recovery of the transmission properties of silica lightguides has been observed after the degraded fibers 'age' at room temperatures for long periods of time. The present invention realizes, however, that the recovery process can be greatly improved by holding the irradiated fibers at an elevated temperature while in use. A temperature range of 200° C. to 400° C. is particularly effective, and a preferred temperature is around 300° C. To this end, the invention uses two basic heating mechanisms and combinations thereof. These two mechanisms for heating the fiber are electrical resistance and IR absorption. Moreover, each mechanism can be enhanced with the addition of a microporous layer enriched with a hydrogen or deuterium gas.

Figure 1:
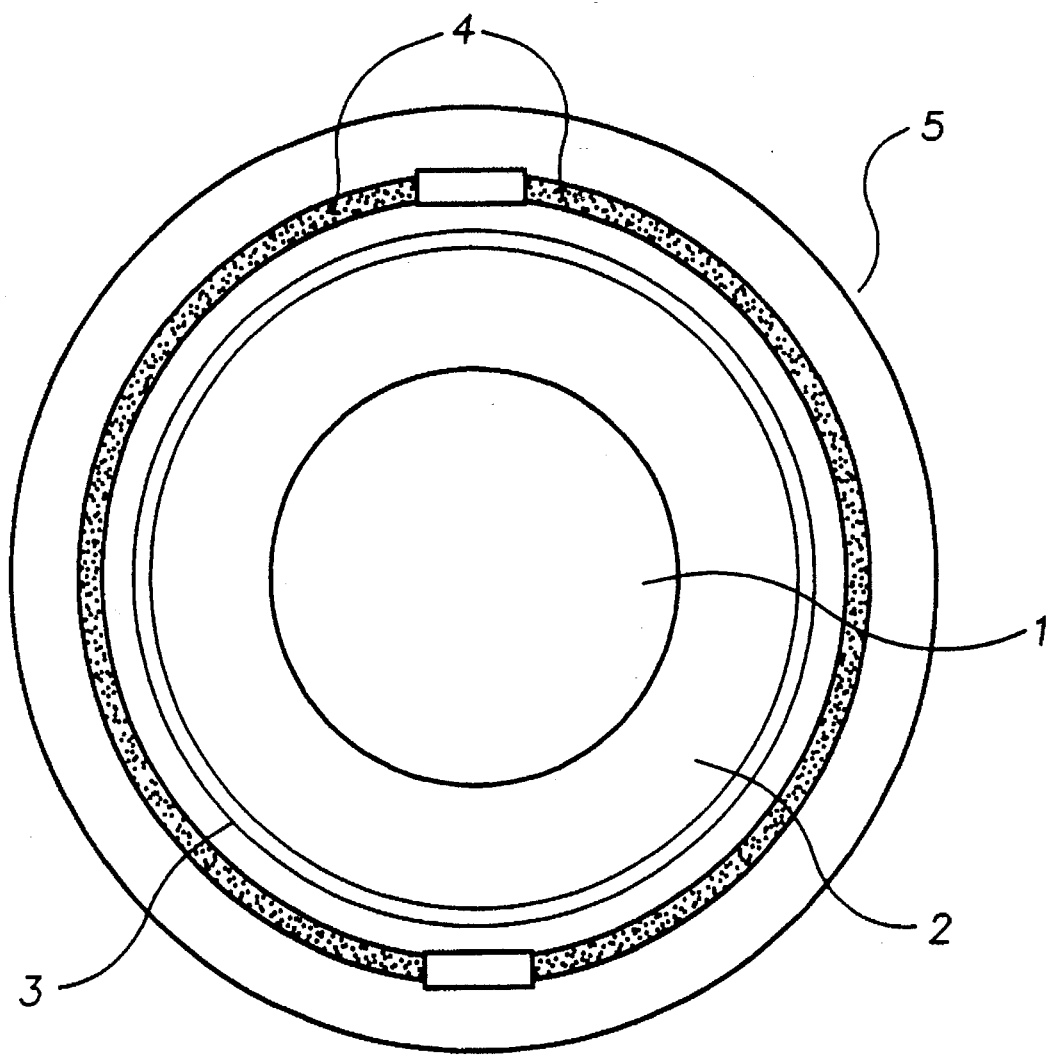
FIG. 1 shows a cross section of the invention using resistive elements as the heating means.

One embodiment of the invention uses electrical resistance to heat the fiber as is shown in FIG. 1. Here, a high OH pure silica core 1 is overlaid with an F-doped silica cladding 2. Cladding 2 in turn is overlaid with a protective, highly electrically insulating polyimide layer 3 which can also withstand exposure to elevated temperatures. Using a commonly known metallizing technique such as sputtering, a resistive element 4, such as a very thin layer of gold, is deposited on polyimide layer 3. Alternatively, the resistive element 4 can be deposited on the fiber in-line as the fiber draw proceeds. It should be noted that resistive element 4 can assume a variety of embodiments providing it possesses sufficient resistance to generate heat when it conducts electric current. Finally, an insulating sheath 5 overlays resistive element 4 to provide thermal and electrical insulation.

Figure 2:
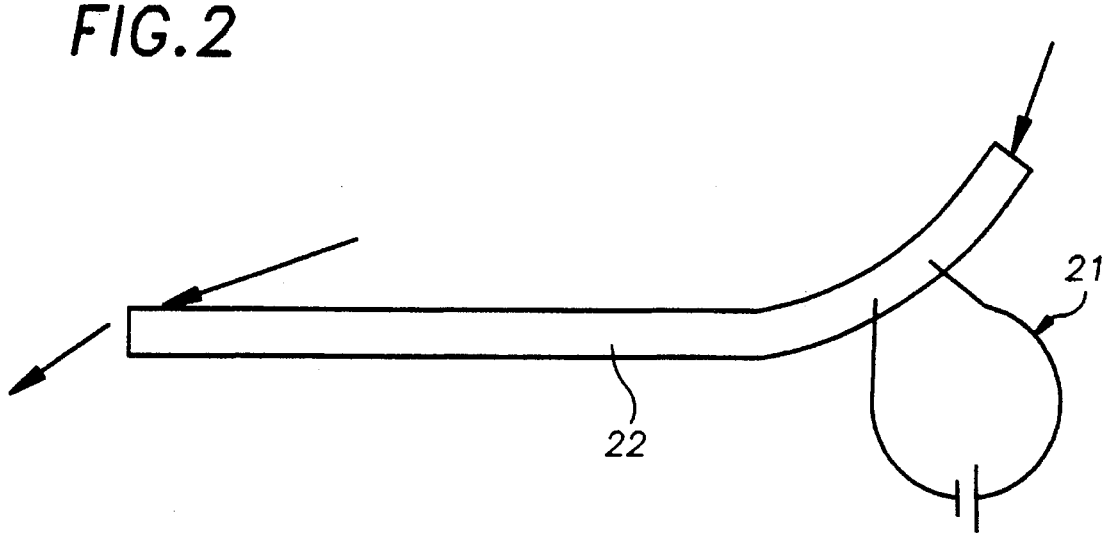
FIG. 2 shows the embodiment of FIG. 1 applied to the electric current means.

FIG. 2 shows the embodiment of FIG. 1 with electric current supply means 21. Electric current supply means 21 can be any traditional low voltage supply source such as a battery. By conducting electricity through resistive element 4, resistive heat is generated. In this way a compact, easy to handle silica lightguide 22 with improved UV transmission can be maintained at 200° C. to 400° C. via its electric resistance. The relatively small current that must be carried through the metallic resistance elements makes this a very elegant and cost effective way to achieve a warm operating fiber.

Preliminary calculations indicate that a 3 meter length of fiber with a 1 mm OD, suspended in air, would require about three watts to maintain it at 300° C. Such energy levels should be available even in the most remote applications. Smaller diameter fibers would require proportionately less energy as would shorter lengths of fiber. Higher energy input would be needed obviously for longer lengths and if the ambient temperature around the fiber was significantly below normal indoor temperatures. Temperature monitoring and regulation along the fiber can be achieved by means of coaxially deployed miniature thermocouples or MIR optical fibers (silver halide based fibers capable of transmitting energy in the mid IR region, i.e. wavelengths between 4–20 μm).

Figure 3:
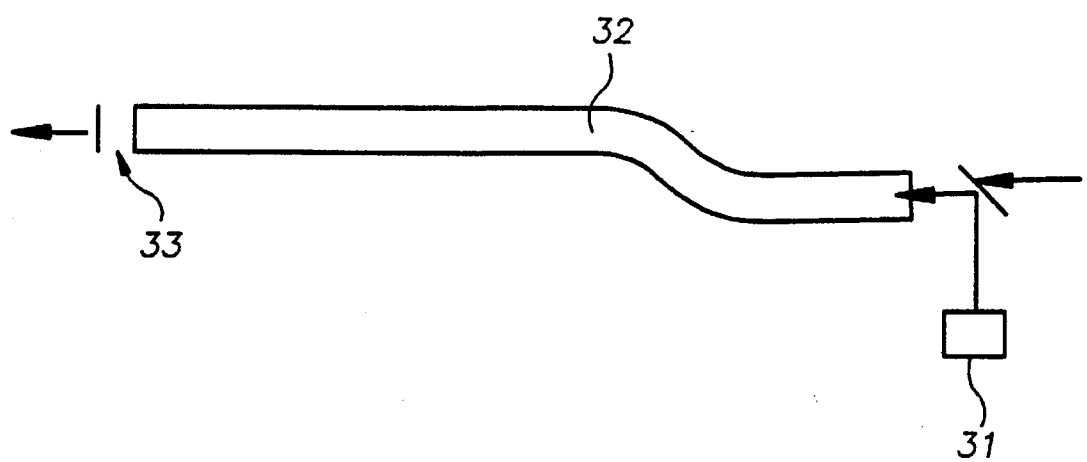
FIG. 3 shows the invention using IR light as the heating means.

Alternatively, diodes and other IR light sources can be used to heat the light guide. A high OH content silica fiber not only offers higher performance in transmitting UV light, but also tends to absorb IR light. By irradiating the fiber at wavelengths which OH absorbs, i.e., overtones of 2.9 μm, the fiber can be heated. As depicted in FIG. 3, an IR irradiation means 31 generates IR light which is directed down a fiber 32. In this particular embodiment an IR reflector 33 is used at the fiber's end to reflect the IR light back through the fiber. Another embodiment of the IR irradiating means 31 may involve employing a source at each end of the fiber. It should be understood, however, that many modes of irradiating the fiber are possible. If the IR method of self-heating is used with high OH level cores, the fiber cross-sections would appear similar to FIG. 1 although it not have the resistive element 4.

Figure 4A:
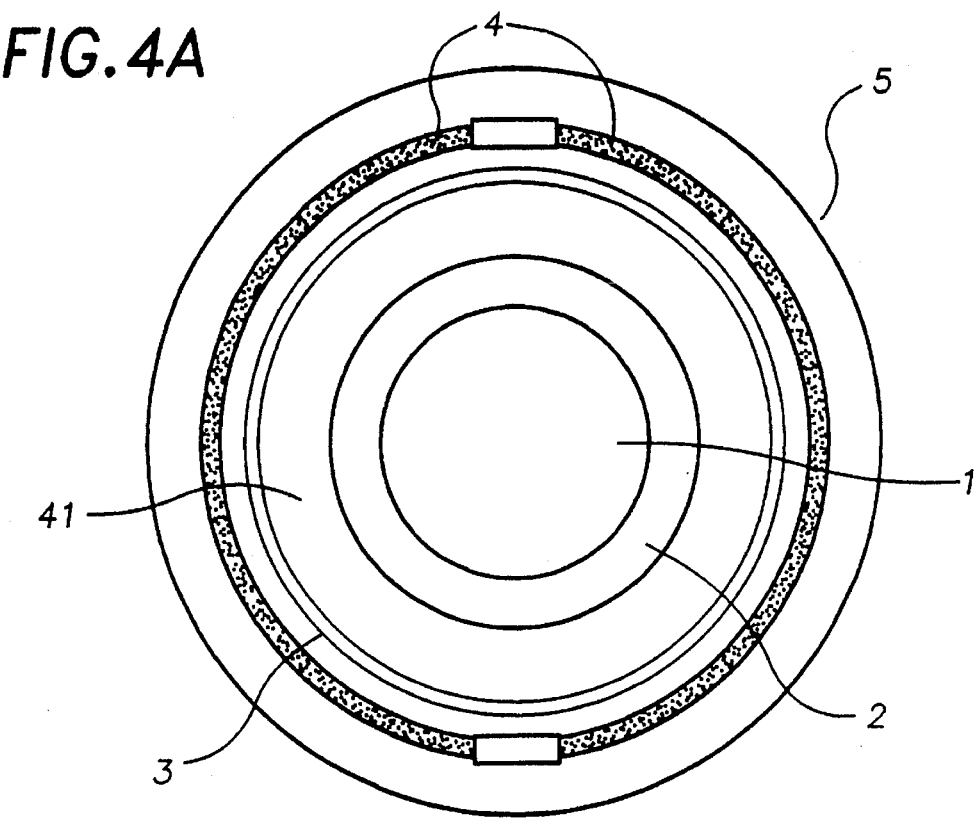
FIG. 4A shows the invention with a microporous layer over the cladding.
Figure 4B:
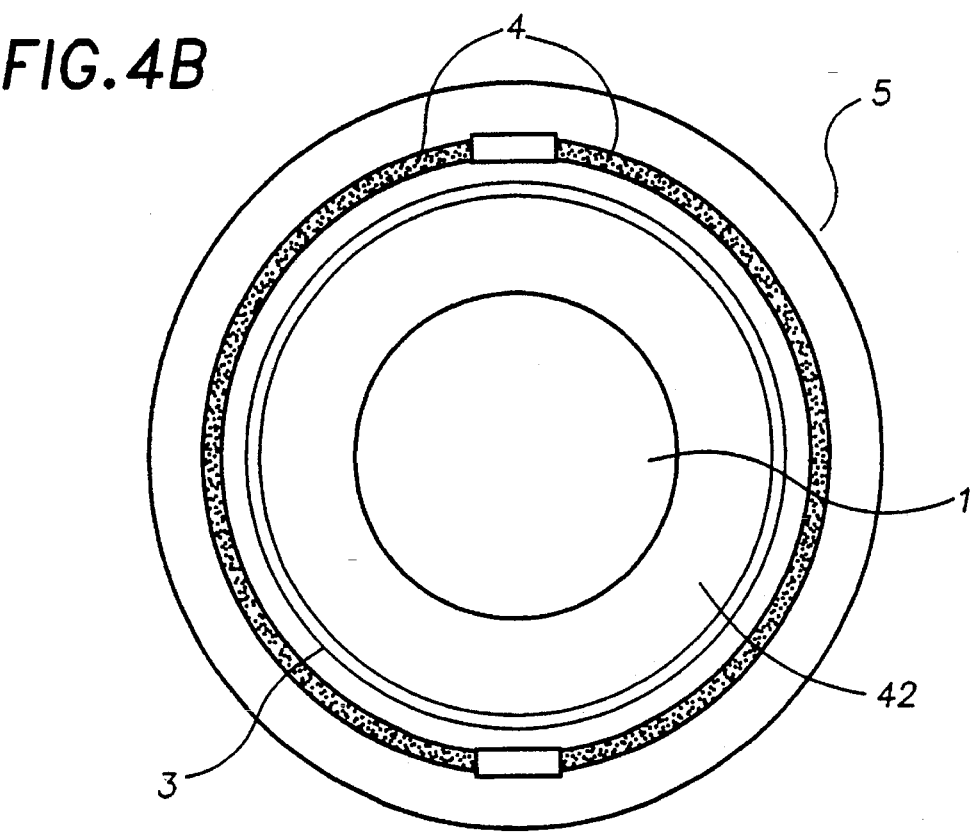
FIG. 4B shows the invention with a microporous layer as the cladding.

Both the electrical resistance and IR absorption schemes for heating the fiber can be further enhanced by the addition of a microporous silica layer. A microporous silica layer 41 can be overlaid on the cladding as shown in FIG. 4a. Alternatively, a microporous silica layer 42 can be cured so that it will function as a cladding when directly overlaid on the fiber core 1 as shown in FIG. 4b.

There is a particular advantage to using the microporous silica layer as cladding. As described earlier, the main damage in standard types of fibers occurs in the vicinity of the core/cladding boundary. It is thought that the tension at the boundary can function as an area of incipient faults which, when activated, may contribute to the degradation of the UV transmission. The stress at this boundary is significantly less for the sol-gel derived cladding in which both core and cladding are composed of same purity of silica. The lower processing temperatures for the sol-gel method may also reduce the tension. Thus, the microporous silica layer cladding is expected to have improved resistance to UV degradation over standard core/clad fibers.

In a preferred embodiment, the microporous silica layer can be loaded with either hydrogen or deuterium gas before the polyimide layer is applied. The presence of the hydrogen or deuterium gas in the microporous layer provides a means for "chemically annealing" UV absorbing defects created during the fiber manufacturing process or during the transmission of UV light. As mentioned in the background section above, it has been found that the majority of the damage sites lie in the 8–10 μm region of the core adjacent to the clad/core interface. This is a reasonable distance for the hydrogen or deuterium to diffuse to deactivate the defects.

Figure 5:
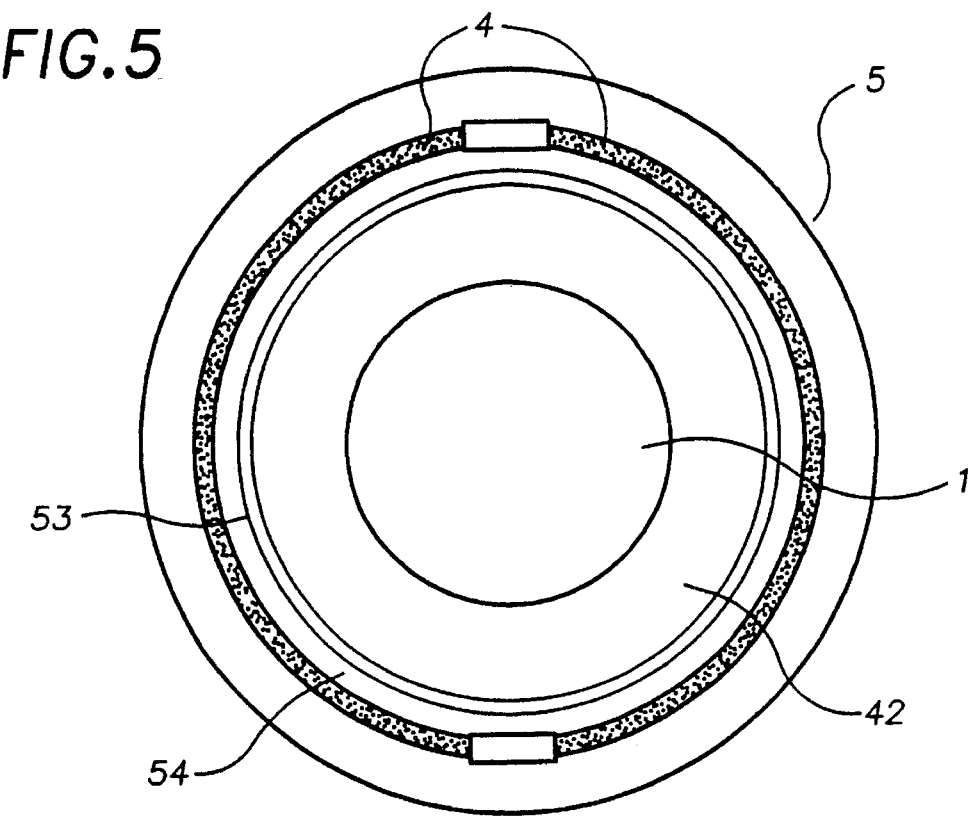
FIG. 5 shows the invention with a hermetic coating directly over the gas impregnated microporous silica layer.

In the preferred embodiment shown in FIG. 5, a hydrogen/deuterium loaded microporous silica layer 52 is coated in-line with a hermetic coating 53, such as metal or silicon nitride. This hermetic coating would reduce the escape over time of the hydrogen or deuterium gas through the microporous silica layer. In addition to containing the hydrogen/deuterium gas, the strength and resistance of the fiber to mechanical degradation in moist or wet environments can be further improved by a hermetic coating.

To create the silicon nitride coating, the steps employed to create the microporous layer can be modified by introducing nitrogen into the outer 'skin' of the sol-gel layer. This skin is then converted into a continuous layer of silicon nitride. The remainder of the sol-gel layer is vitrified to the microporous silica state.

Figure 6:
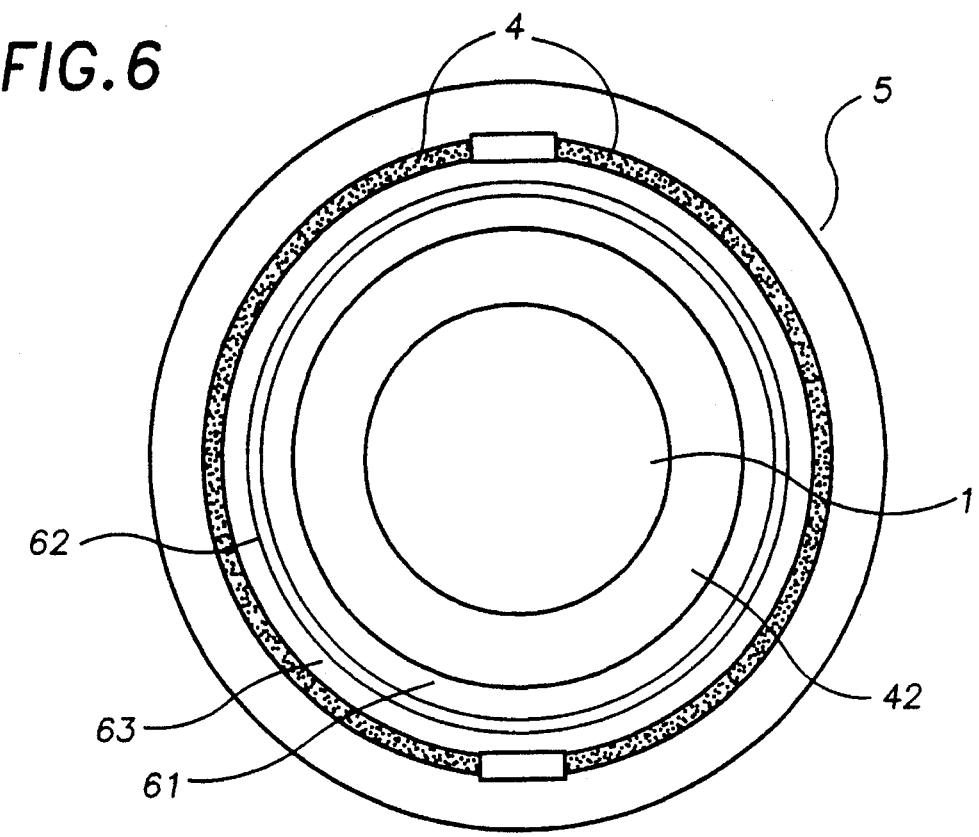
FIG. 6 shows the invention with a polyimide layer directly over the gas impregnated microporous silica layer.

Over the hermetic coating 53, a polyimide layer 54 is added. This layer serves to protect the fiber and to facilitate its handling during the manufacturing process. In an alternative embodiment of the enhanced invention shown in FIG. 6, a polyimide layer 61 overlies the microporous silica layer 42. A metallic or other hermetic coating 62 is applied over the polyimide layer 61, and a second polyimide layer 63 is applied over the hermetic coating 62. This does create a slightly higher cross-section for the fiber, however, handling the fiber during production is easier and safer. By permitting handling of the fiber after the microporous silica layer has been formed and stabilized, a better and more optimal loading of the fiber with the hydrogen/deuterium gas and a cost effective application of the hermetic and protective coatings can be employed.

Obviously, numerous modifications and variations of the present invention are possible in the light of the above teachings. It is therefore understood that within the scope of the appended claims, the invention may be practiced otherwise than as specifically described herein.

What is claimed is:

1. A lightguide for stable transmission of UV light, said lightguide comprises:

a. a core;

b. a microporous silica cladding laver overlaying said core; and c. heating means for elevating and maintaining the temperature of said lightguide to between 200° C. and 400° C., while trasmitting said UV light in said lightguide.

2. The device of claim 1 wherein said heating means comprises:

i. a resistive element overlying said cladding, said resistive element has sufficient resistance to produce heat when conducting electric current; and ii. electric current supply means for supplying said resistive element with electric current.

3. The lightguide claimed in claim 2 wherein said microporous silica layer contains a gas selected from the group consisting of hydrogen and deuterium.

4. The lightguide claimed in claim 3 which further comprises:

d. a hermetic coating overlying said microporous silica layer to retard the diffusion of said gas from said core and cladding.

5. The lightguide of claim 1 wherein said heating means comprises:

i. IR irradiating means for irradiating said core with IR light at an OH absorption wavelength.

6. The lightguide claimed in claim 5 wherein said microporous silica layer contains a gas selected from the group consisting of hydrogen and deuterium.

7. The lightguide claimed in claim 6 which further comprises:

d. a hermetic coating overlying said microporous silica layer to retard the diffusion of said gas from said core and cladding.

8. The lightguide of claim 5 wherein said heating means comprises:

i. a resistive element overlying said cladding, said resistive element has sufficient resistance to produce heat when conducting electric current; and ii. electric current supply means for supplying said resistive element with electric current.

9. A lightguide for stable transmission of UV light, said lightguide comprises:

a. a core;

b. a cladding layer overlaying said core;

c. a microporous silica coating layer overlying said cladding; and d. heating means for elevating and maintaining the temperature of said lightguide to between 200° C. and 400° C., while transmitting said UV light in said lightguide.

10. The lightguide according to claim 9 wherein said microporous silica coating layer contains a gas selected from the group consisting of hydrogen and deuterium.

11. The lightguide according to claim 9 wherein said microporous silica coating layer contains a gas selected from the group consisting of hydrogen and deuterium.

12. The lightguide according to claim 11 which further comprises:

e. a hermetic coating overlying said microporous silica coating layer to retard diffusion of said gas from said lightguide.

13. The lightguide according to claim 9 wherein said cladding comprises a second microporous silica layer.

14. The lightguide according to claim 13 wherein at one microporous silica layer contains a gas selected from the group consisting of hydrogen and deuterium.

15. The lightguide according to claim 14 which further comprises:

e. a hermetic coating overlying said microporous silica coating layer to retard diffusion of said gas from said lightguide.

16. The lightguide according to claim 9 wherein said heating means comprises:

i. IR iradiating means for irradiating said core with IR light at an OH absorption wavelength.

17. The lightguide according to claim 9 wherein said heating means comprises:

i. a resistive element overlying said coating layer, said resistive element has sufficient resistance to produce heat when conducting electric current; and ii. electric current supply means for supplying said resistive element with electric current.

* * * * *